United States Patent
Cheng et al.

(10) Patent No.: US 7,881,515 B2
(45) Date of Patent: Feb. 1, 2011

(54) CEPHALOGRAM IMAGE ANALYSIS METHOD

(75) Inventors: Kuo-Sheng Cheng, Tainan (TW); Yen-Tin Chen, Tainan (TW); Jia-Kuang Liu, Tainan (TW)

(73) Assignee: National Cheng Kung University, Tainan (TW)

( * ) Notice: Subject to any disclaimer, the term of this patent is extended or adjusted under 35 U.S.C. 154(b) by 799 days.

(21) Appl. No.: 11/859,960

(22) Filed: Sep. 24, 2007

(65) Prior Publication Data
US 2009/0003667 A1    Jan. 1, 2009

(30) Foreign Application Priority Data
Jun. 27, 2007    (TW) ................ 96123375 A

(51) Int. Cl.
*G06K 9/00* (2006.01)
(52) U.S. Cl. ........................ 382/132; 382/190; 382/199
(58) Field of Classification Search .................. 382/132
See application file for complete search history.

(56) References Cited

U.S. PATENT DOCUMENTS

| | | | | |
|---|---|---|---|---|
| 5,278,756 A * | 1/1994 | Lemchen et al. | ............ | 600/587 |
| 5,742,700 A * | 4/1998 | Yoon et al. | ................ | 382/132 |
| 5,951,498 A * | 9/1999 | Arnett | ................ | 600/587 |
| 6,058,200 A * | 5/2000 | Blaseio | ................ | 382/100 |
| 6,068,482 A * | 5/2000 | Snow | ................ | 433/223 |
| 6,845,175 B2 * | 1/2005 | Kopelman et al. | ......... | 382/154 |
| 7,292,716 B2 * | 11/2007 | Kim | ................ | 382/128 |
| 7,717,708 B2 * | 5/2010 | Sachdeva et al. | ............ | 433/24 |
| 7,792,341 B2 * | 9/2010 | Schutyser | ................ | 382/128 |
| 7,817,817 B2 * | 10/2010 | Wu et al. | ................ | 382/100 |
| 2006/0120582 A1 * | 6/2006 | Squilla et al. | ............ | 382/128 |
| 2007/0197902 A1 * | 8/2007 | Schutyser | ................ | 600/416 |
| 2009/0003667 A1 * | 1/2009 | Cheng et al. | ............ | 382/128 |

OTHER PUBLICATIONS

Weining Yue, Dali Yin, Chengjun Li, Guoping Wang, Tianmin Xu, "Automated 2-D Cephalometric Analysis on X-ray Images by a Model-Based Approach", Biomedical Engineering, IEEE Transactions on, Aug. 2006, vol. 53 Issue:8, pp. 1615-1623, ISSN: 0018-9294.*
Chen, Y.T; Cheng, K.S; Liu, J.K; "Improving Cephalogram Analysis through Feature Submiage Extraction;" IEEE Engineering in Medicine and Biology; Jan./Feb. 1999; pp. 25-31.

* cited by examiner

*Primary Examiner*—Sath V Perungavoor
(74) *Attorney, Agent, or Firm*—Thomas, Kayden, Horstemeyer & Risley, LLP

(57) ABSTRACT

An automated cephalogram image analysis method is disclosed. In this method, a step is first performed for building a reference database in which a set of tracing feature curve models respectively representing a set of reference cephalometric patterns are established based on a set of tracing records. Then, a step of pattern comparison and analysis is performed. In this step, at least one cephalogram is first input, and then a step is performed for comparing the image of the cephalogram with the tracing feature curve models, thereby selecting at least one cephalometric pattern and at least one feature curve model belonging to the cephalometric pattern from the reference cephalometric patterns and the tracing feature curve models. Thereafter, the feature curve model is fitted to the image of the cephalogram so as to obtain at least one tracing of the at least one cephalogram.

10 Claims, 10 Drawing Sheets

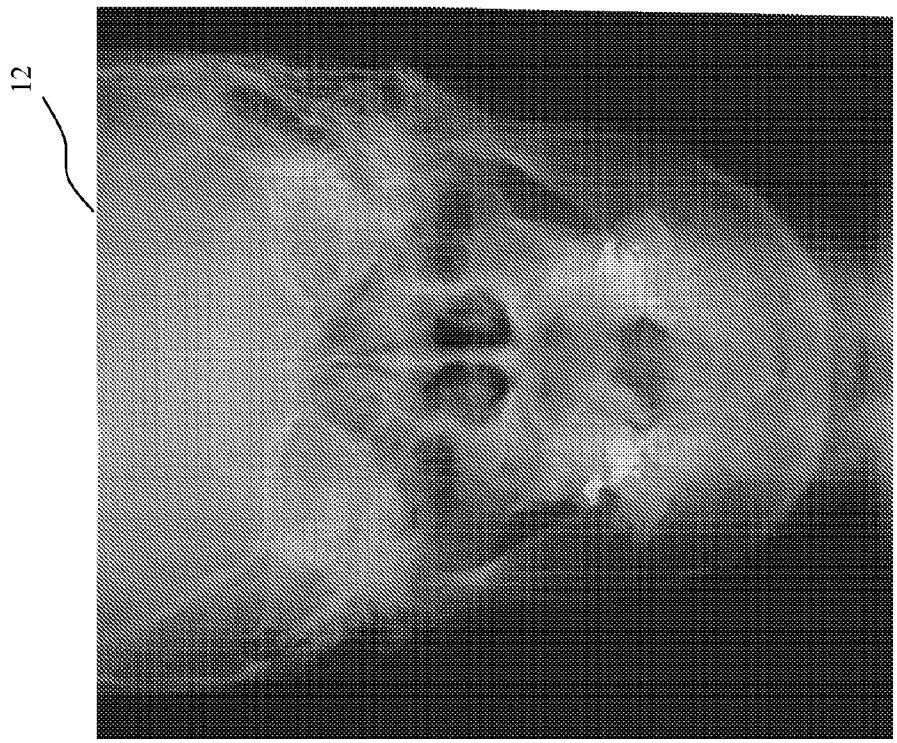
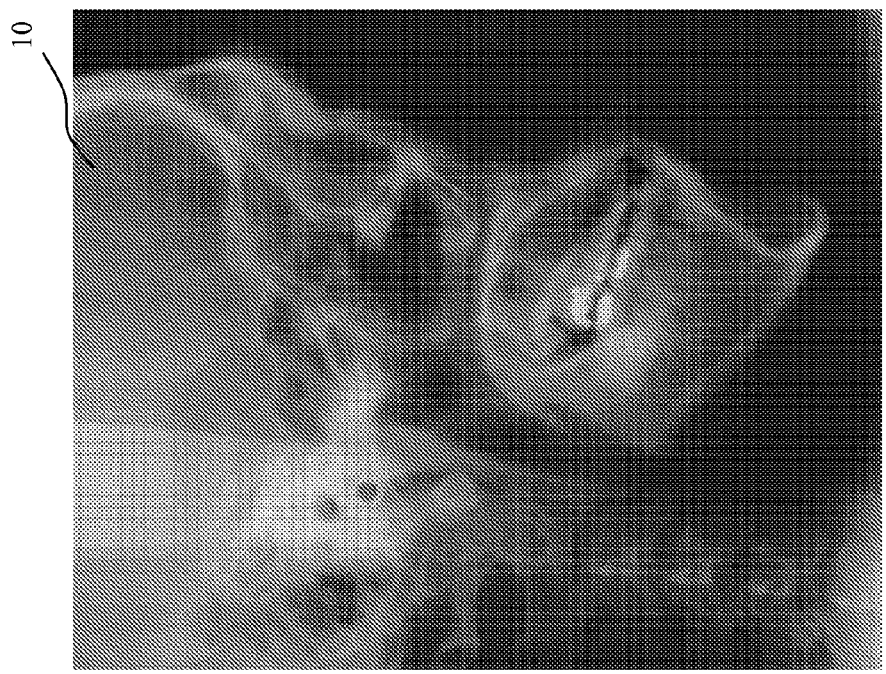
FIG 1A (PRIOR ART)

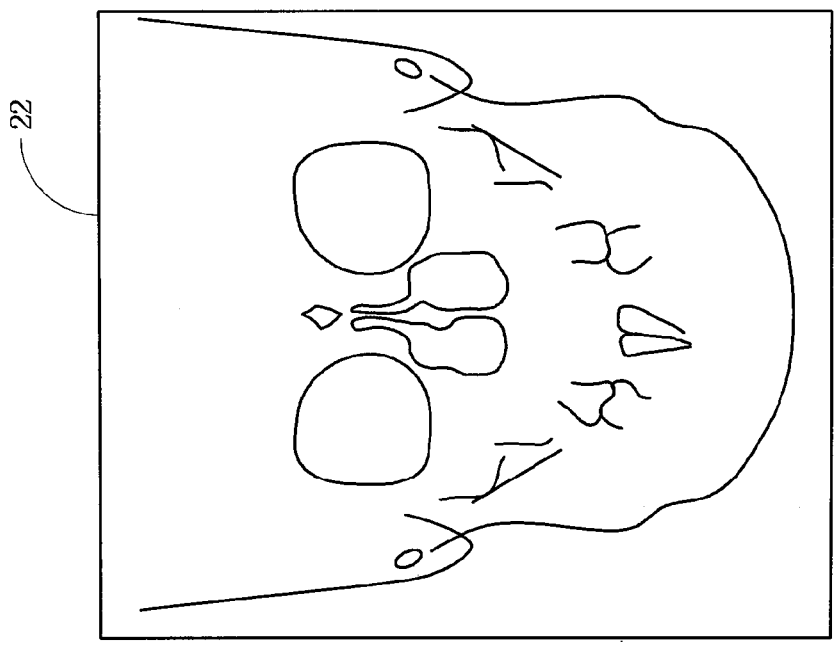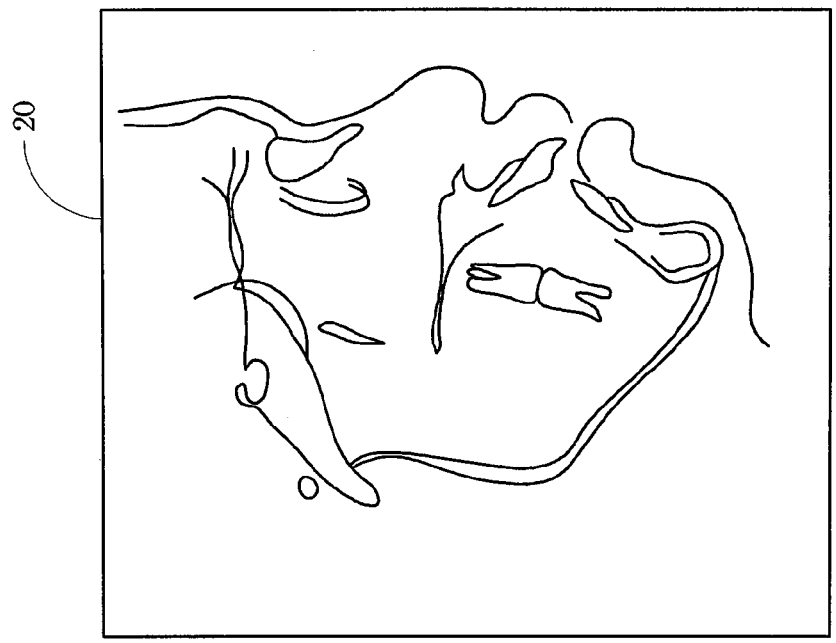
Fig. 1B
(PRIOR ART)

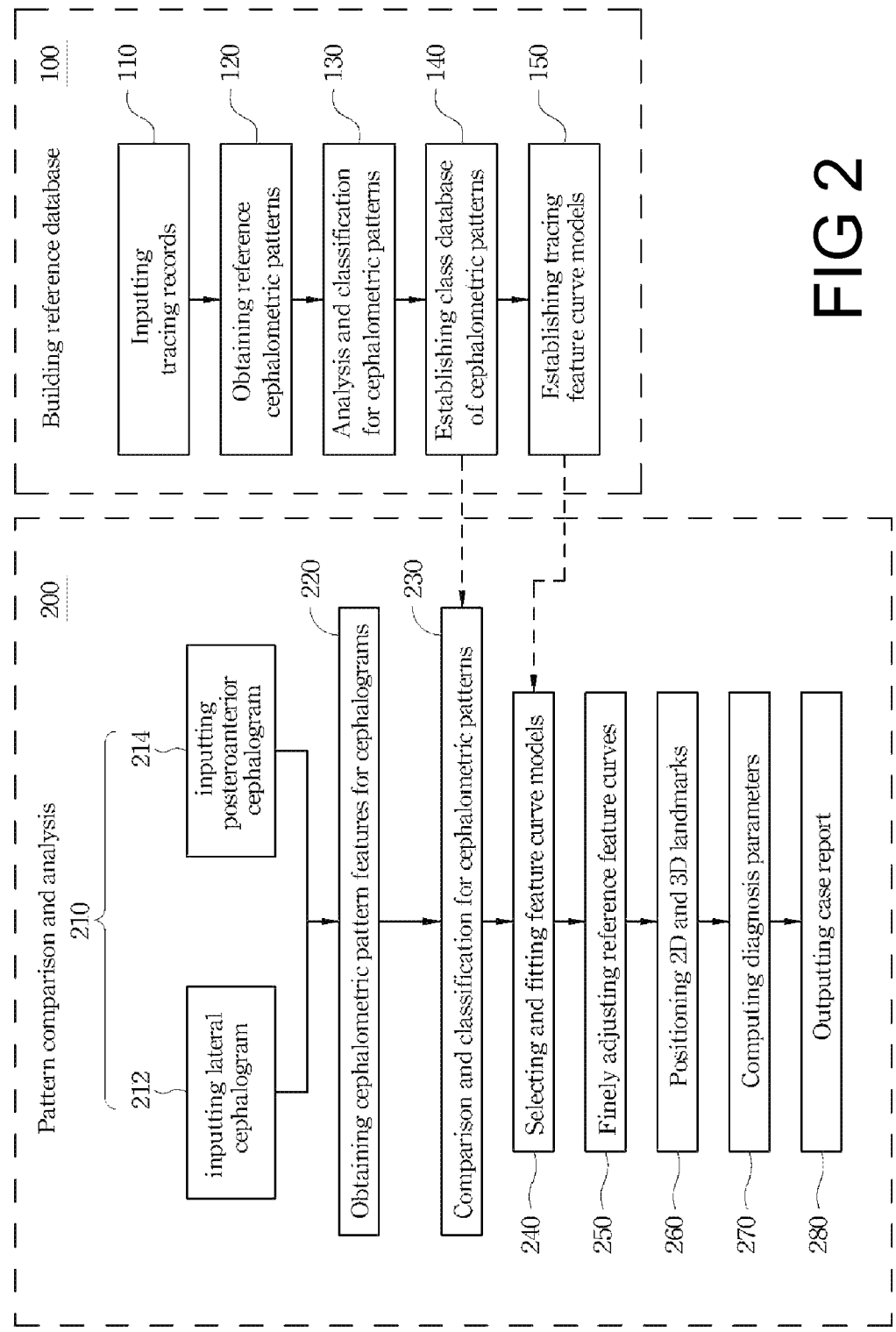

| 87-006 | LIN | ↕ | 19Y2M | original | R1 Tsai I/VS Tsai |

The superimposition tech : None

Skeletal Factor

SNA= 75.0°   (84.2 ± 3.2)
SNB= 73.0°   (81.2 ± 3.0)
SNB= 2.0°    (2.9 ± 1.9)
$NAP_g$ = 3.0°   (5.4 ± 4.9)
SN-FH= 8.0°   (5.7 ± 3.0)
$SN-N_P$ = 39.5°   (5.7 ± 3.0)
$A-N_V$ = -8.5mm  (-5.8 ± 5.6)
$P_g - N_V$ = -19.0mm  (-5.8 ± 5.6)
UFH/LFH= 44.3% / 55.7%
         (45%/55%)

Dental Factor

UI-SN= 107.5°   (109.9 ± 5.6)
UI-LI= 112.0°   (120.9 ± 8.4)
UI-NP= 15.0mm   (6.4 ± 2.7)
UI-OP= 67.0°    (61.8 ± 5.4)
LI-NP= 101.0°   (101.4 ± 7.0)

Jaw Triangle

Ar-A= 88.5mm    (6.4 ± 4.5)
Ar-Gn= 118.0mm  (119.0 ± 5.8)
A-Gn= 67.5mm    (63.9 ± 5.1)
Maxi/Nand= 75.0% (78.3% ± 3.0%)
A-Ar-Gn= 34.5°  (32.2 ± 2.6)
Ar-A-Gn= 97°    (96.9 ± 4.1)
Ar-Gn-A= 48.5°  (51.0 ± 3.3)

Vector Formula

| ab | − | ul | = | au | − | bl |
|---|---|---|---|---|---|---|
| 10.0 | | 5.0 | | -8.5 | | -13.5 |
| (5.7 ± 3.3) | | (3.0 ± 1.5) | | (-5.9 ± 2.4) | | (-8.5 ± 2.8) |

Fig. 7

CEPHALOGRAM IMAGE ANALYSIS METHOD

RELATED APPLICATIONS

This application claims priority to Taiwan Application Serial Number 96123375, filed Jun. 27, 2007, which is herein incorporated by reference.

BACKGROUND

1. Field of Invention

The present invention relates to a cephalogram image analysis method. More particularly, the present invention relates to a cephalogram image analysis method used for transforming cephalograms into tracings.

2. Description of Related Art

In orthodontic treatment, cephalometry is quite an important metrology technique for analyzing patient's anatomical structure and evaluating the treatment effects. Cephalograms are X-ray films taken at a head portion, and the X-ray films (cephalograms) of posteroanterior view and lateral view are frequently used in clinic.

Referring to FIG. 1A to FIG. 1C, FIG. 1A illustrates a lateral cephalogram 10 and a posteroanterior cephalogram 12; FIG. 1B illustrates a tracing 20 of the lateral cephalogram 10, and a tracing 22 of the posteroanterior cephalogram 12; and FIG. 1C illustrates the tracing 20 of the lateral cephalogram 10 with landmarks shown thereon. When at least one cephalograms (such as the lateral cephalogram 10 and the posteroanterior cephalogram 12) are in use, the anatomical features and landmarks of the cephalograms have to be drawn on tracing papers, thereby obtaining tracings (such as the tracing 20 and the tracing 22). The so-called "landmarks" stand for a set of feature points defined from anatomical viewpoints for use in marking an anatomical structure, and can be used for analyzing the geometrical features of the anatomical structure, such as landmarks S, Po, Na, PNS, UIA, ANS, A, MI, LIE, UIE, LIA, B, Pog, Gn, Me, etc. as shown in FIG. 1C. Those landmarks are well known to those who are skilled in the art, and thus are not described in detail herein. The tracing paper is a piece of acetate similar to a translucent paper. In a conventional clinical and cephalometric assessment, a tracing paper is manually overlaid on a cephalogram, and then a set of landmarks and their associated feature curves are drawn and marked one by one so as to form a tracing.

Various cephalogram analysis methods are used to define geometrically related parameters by referring to the positions of these landmarks, thereby computing the measures of the anatomical structure, such as the data of distances, angles, etc. However, such manual drawing process is quite time and effort consuming, and since the definitions of landmarks mostly belong to semantic description, the expert experience of the plotter (physician) will greatly influence the accuracy of the tracing.

Hence, there is a need to provide an automated cephalogram image analysis method for effectively transforming a cephalogram into a tracing, thereby overcoming the disadvantages of the conventional skill.

SUMMARY

One aspect of the present invention is to provide an automated cephalogram image analysis method for effectively and accurately transforming a cephalogram into a tracing without relying on expert experience.

In accordance with the aforementioned aspect, a cephalogram image analysis method is provided. According to an embodiment of the present invention, in the cephalogram image analysis method, a step of building a reference database is first performed for establishing a set of tracing feature curve models respectively representing a set of reference cephalometric patterns based on a set of tracing records. Thereafter, a step of pattern comparison and analysis is performed. In the step of pattern comparison and analysis, at least one cephalogram (such as a lateral cephalogram and/or a posteroanterior cephalogram) is first input; and then a comparison step is performed for comparing the image of the at least one cephalogram with the tracing feature curve models, thereby selecting at least one cephalometric pattern and at least one feature curve model belonging to the at least one cephalometric pattern from the reference cephalometric patterns and the tracing feature curve models; and thereafter the at least one feature curve model is fitted to the image of the at least one cephalogram respectively, so as to obtain at least one tracing of the at least one cephalogram.

According to the embodiment of the present invention, the aforementioned step of building the reference database further comprises: inputting the tracing records, wherein each tracing record has a set of tracing curves; defining a set of reference feature portions; vectorizing the tracing curves located at the reference feature portions in each tracing record, thereby obtaining a set of reference vector curves of each tracing record; analyzing the reference vector curves of each tracing record, thereby obtaining the reference cephalometric patterns; classifying the tracing records into the reference cephalometric patterns; and extracting a set of reference feature curves with respect to the reference vector curves of the tracing records belonging to each reference cephalometric pattern, thereby establishing the tracing feature curve models respectively representing the reference cephalometric patterns.

According to the embodiment of the present invention, the aforementioned step of pattern comparison and analysis further comprises: retrieving and vectorizing the profile features from the image of each cephalogram, and the curves of the image of each cephalogram located at the reference feature portions, thereby obtaining a set of feature curves of the image of each cephalogram; performing the comparison step with respect to the feature curves of the image of each cephalogram, and the reference feature curves of the tracing feature curve models, thereby obtaining the at least one cephalometric pattern and the at least one feature curve model belonging to the at least one cephalometric pattern; respectively aligning at least one of the reference feature curves of each feature curve model to at least one of the feature curves of the cephalogram corresponding to the feature curve mode; and using an edge-detecting and curve-adjusting technique to adjust the detailed locations of the remaining reference feature curves of each feature curve model, thereby overlapping and matching the image of the at least one cephalogram with the at least one feature curve model.

According to another embodiment of the present invention, the reference feature portions are defined in accordance with the definition of positions of a set of landmarks and the image features surrounding the landmarks.

According to another embodiment of the present invention, the reference feature portions are defined in accordance with the sizes and growth patterns of human skulls.

According to another embodiment of the present invention, a back projection method is used to estimating at least one 3-D coordinate of at least on landmark in accordance with the feature curve models obtained by inputting the lateral cephalogram and the posteroanterior cephalogram.

Hence, with the application of the embodiments of the present invention, a cephalogram can be effectively and accurately converted into a tracing, thus saving time and effort, and avoiding relying on expert experience.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 1A illustrates a lateral cephalogram and a posteroanterior cephalogram;

FIG. 1B illustrates a tracing of the lateral cephalogram, and a tracing of the posteroanterior cephalogram;

FIG. 2 is a schematic flow chart showing a cephalogram image analysis method according to an embodiment of the present invention;

FIG. 7 is a schematic diagram of a case report according to the embodiment of the present invention.

DESCRIPTION OF THE PREFERRED EMBODIMENTS

Figure 1C:
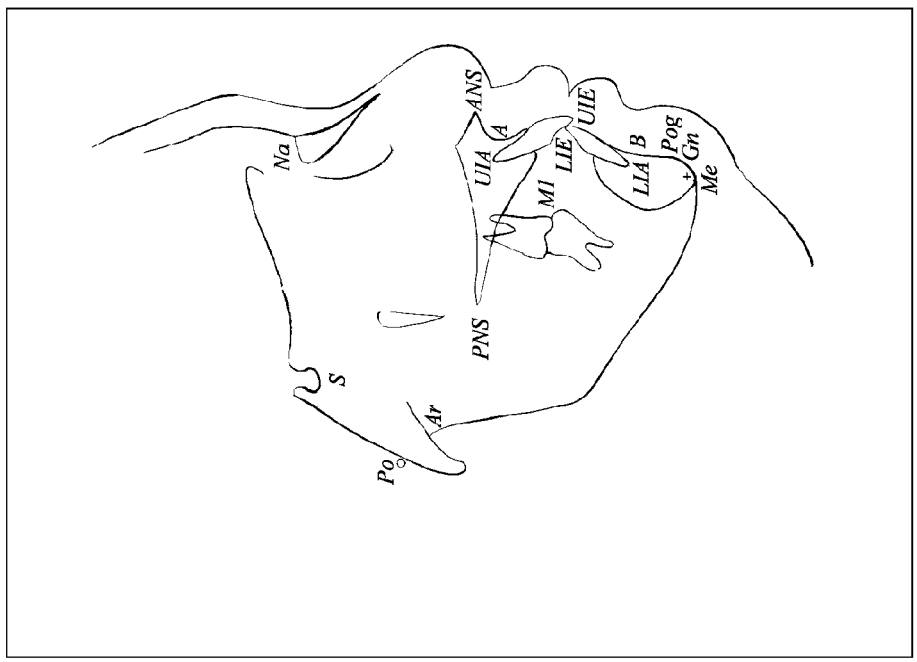
FIG. 1C illustrates the tracing of the lateral cephalogram with landmarks shown thereon.

Reference will now be made in detail to the preferred embodiments of the present invention, examples of which are illustrated in the accompanying drawings. Wherever possible, the same reference numbers are used in the drawings and the description to refer to the same or like parts.

Referring to FIG. 2, FIG. 2 is a schematic flow chart showing a cephalogram image analysis method according to an embodiment of the present invention. The cephalogram image analysis method of this embodiment comprises a step 100 of building a reference database, and a step 200 of pattern comparison and analysis. In this embodiment, the step 100 of building a reference database is first performed for establishing a set of tracing feature curve models respectively representing a set of reference cephalometric patterns in accordance with a set of tracing records. The so-called "tracing records" mean a set of tracings which have been accumulated and depicted in the past with respect to the historical cephalograms. Thereafter, the step 200 of pattern comparison and analysis is performed to obtain a tracing(s) matching the image(s) of the cephalogram(s) desired to be analyzed.

In the step 100 of building a reference database, the tracing records are first input (step 110), wherein each tracing record has a set of tracing curves (such as shown in FIG. 1A and FIG. 1B). The tracings can be digitized by an image-capturing device such as a digital camera or a scanner, or are digital image files in which a set of tracing curves are first depicted via a touch-control device and then are digitized.

Figure 3A:
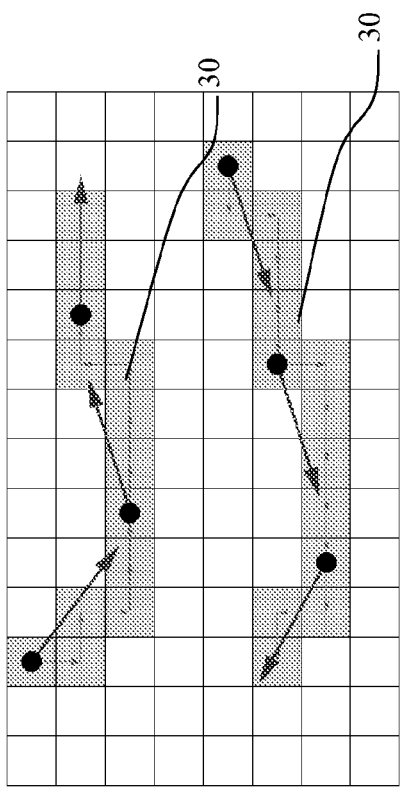
FIG. 3A is a schematic diagram for vectorizing a tracing curve according to the embodiment of the present invention.
Figure 3B:
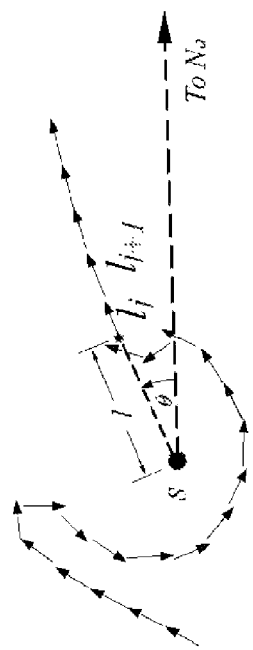
FIG. 3B is a schematic diagram showing a vectorized tracing curve (reference vector curve) at the sella turcica region according to the embodiment of the present invention.

Thereafter, such as shown in FIG. 2, step 120 is performed for obtaining the reference cephalometric patterns. In step 120, a set of reference feature portions are first defined, which can be based on, for example, the definition of the positions of the landmarks as shown in FIG. 1C and the image features surrounding the landmarks; or the sizes and growth patterns of human skulls, such as adult skulls, children skulls, occlusion patterns and facial profile patterns etc. Then, a vector quantification step is performed to vectorize the tracing curves located at the reference feature portions in each tracing record, the reference feature portions including such as the sella turcica region, the cranial base, the mandible structure, the maxilla structure, the molar teeth locations and the eye orbits, etc., thereby obtaining a set of reference vector curves of each tracing record. Such as shown in FIG. 3A and FIG. 3B, FIG. 3A is a schematic diagram for vectorizing a tracing curve according to the embodiment of the present invention; and FIG. 3B is a schematic diagram showing a vectorized tracing curve (reference vector curve) at the sella turcica region according to the embodiment of the present invention. Thereafter, the reference vector curves of each tracing record are analyzed, thereby obtaining a set of reference cephalometric patterns.

Such as shown in FIG. 2, then, step 130 of analysis and classification for cephalometric patterns is performed, wherein the information obtained from step 120 is analyzed, so as to classify the reference cephalometric patterns into several representative patterns such as a mandible protrusion pattern, a mandible retrusion pattern and a maxilla protrusion pattern, etc. Thereafter, step 140 is performed to establish a class database of cephalometric patterns by using the reference cephalometric patterns classified in step 130, and to classify the tracing records into the reference cephalometric patterns. Then step 150 is performed for extracting a set of reference feature curves with respect to the reference vector curves of the tracing records belonging to each reference cephalometric pattern, thereby establishing the tracing feature curve models respectively representing the reference cephalometric patterns.

After the class database of cephalometric patterns and the tracing feature curve models are obtained, the step 200 of pattern comparison and analysis can be performed for converting the cephalograms into the tracings corresponding thereto.

In the step 200 of pattern comparison and analysis, step 210 is first performed for inputting at least one cephalograms, wherein the step 210 may include inputting a lateral cephalogram (step 212) and inputting a posteroanterior cephalogram (step 214). The lateral cephalogram and the posteroanterior cephalogram both are in the format of digital image file, and can be, for example, taken by a digital camera or captured by a scanner, and stored as gray-level digital files.

Figure 4:
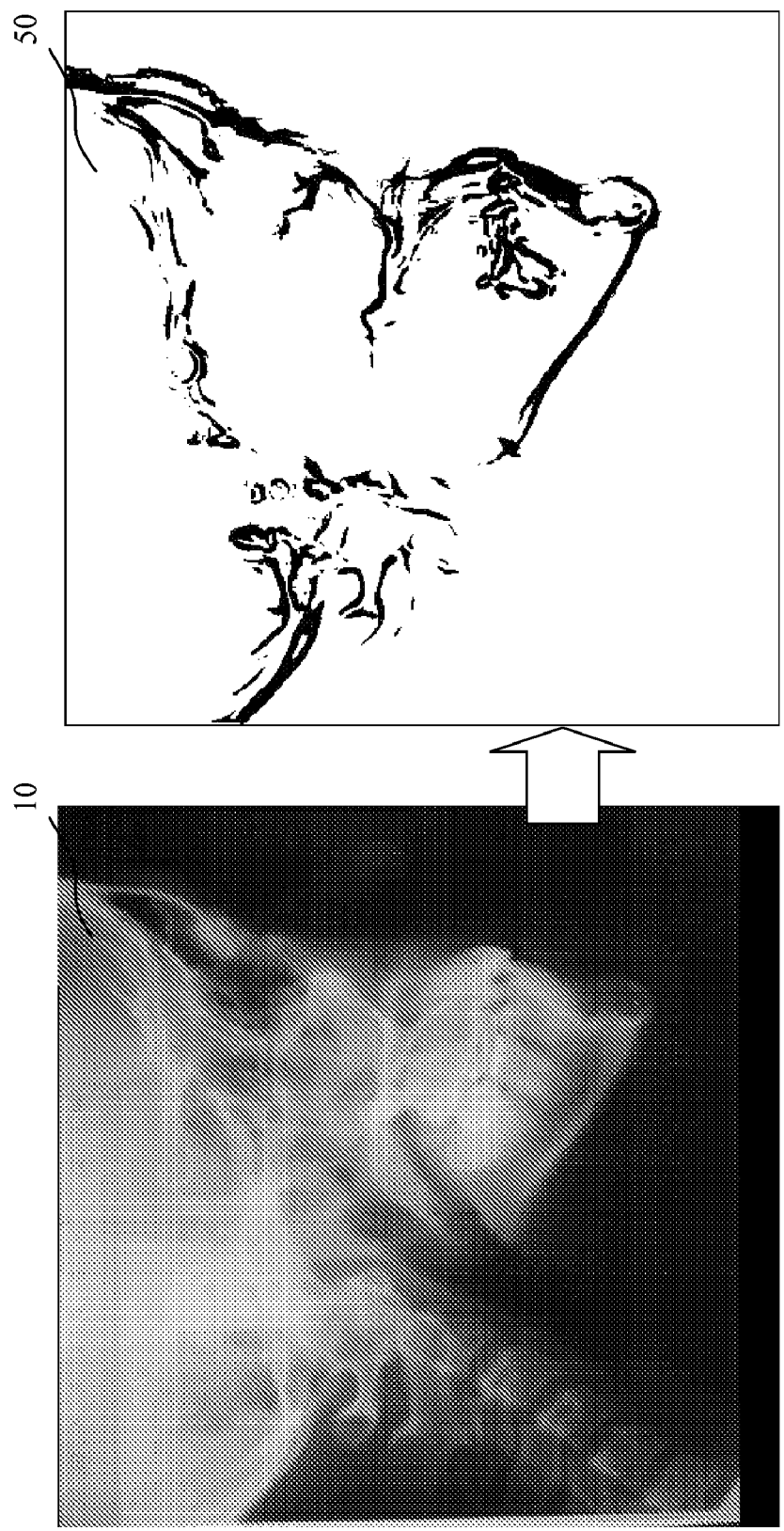
FIG. 4 is a schematic diagram of retrieving the profile features and curves of the lateral cephalogram according to the embodiment of the present invention.

Thereafter, step 220 of obtaining cephalometric pattern features for cephalograms is performed, wherein the profile features from the image of each cephalogram; and the curves of the image of each cephalogram located at the aforementioned reference feature portions defined in step 120, are retrieved and vectorized, thereby obtaining a set of feature curves of the image of each cephalogram. Referring to FIG. 4, FIG. 4 is a schematic diagram of retrieving the profile features and curves of the lateral cephalogram 10 according to the embodiment of the present invention. In step 220, image border or profile algorithms are used to enhance the profile features of the image of the lateral cephalogram 10, and the defined reference feature portions are used to retrieve and vectorize the profile features, thereby obtaining a feature curve diagram 50 of the lateral cephalogram 10, wherein the defined reference feature portions are based on, such as the positions of the landmarks and their surrounding image features; and the representative image features induced from the sizes and growth patterns of human skulls, such as adult skulls, children skulls, occlusion patterns and facial profile patterns etc.

Thereafter, step 230 of comparison and classification for cephalometric patterns is performed, wherein a comparison step is performed with respect to the feature curves of the lateral and posteroanterior cephalograms; and the reference feature curves of the tracing feature curve models, thereby obtaining the cephalometric patterns which are the most close to the respective cephalograms input from the class database of cephalometric patterns built in step 140; and also obtaining from the tracing feature curve models established in step 150 the lateral and posteroanterior feature curve models belonging to the cephalometric patterns obtained.

Figure 5:
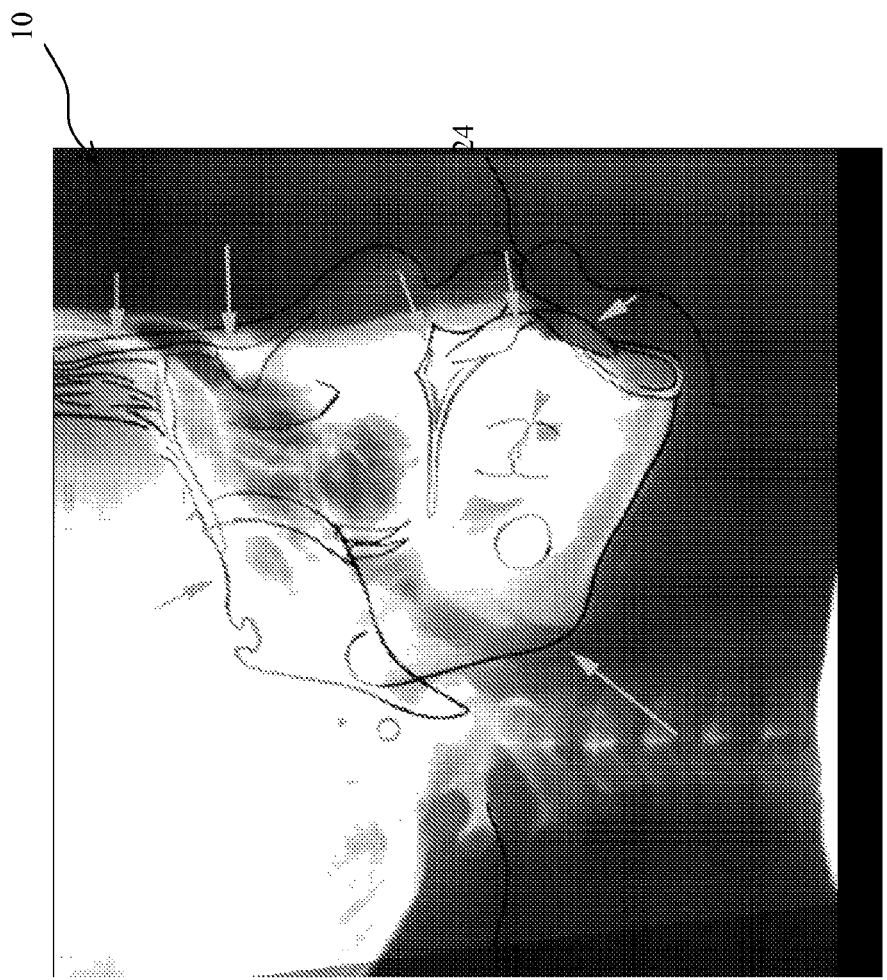
FIG. 5 is a schematic diagram of fitting a lateral feature curve model to the image of the lateral cephalogram according to the embodiment of the present invention.
Figure 8:
FIG. 8 is a schematic diagram showing the lateral feature curve model according to the embodiment of the present invention.

Then, step 240 of selecting and fitting the feature curve models is performed, wherein the lateral and posteroanterior feature curve models are respectively disposed over the images of the lateral and posteroanterior cephalograms. Step 240 is performed to align at least one of the reference feature curves of each feature curve model to at least one of the feature curves of the cephalogram corresponding to the feature curve mode. Referring to FIG. 5, FIG. 5 is a schematic diagram of fitting a lateral feature curve model to the image of the lateral cephalogram according to the embodiment of the present invention, wherein lateral feature curve model 24 is also shown in FIG. 8. Using the lateral cephalogram 10 as an example for explanation, step 240 is performed to overlap and match the lateral feature curve model 24 obtained in step 230 with the lateral cephalogram 10, wherein a mandible reference feature curve of the lateral feature curve model 24 is first aligned to the corresponding feature curve of the lateral cephalogram 10. Similarly, step 240 is also performed to overlap and match the posteroanterior feature curve model 45 with the posteroanterior cephalogram.

Thereafter, step 250 of finely adjusting the reference feature curves is performed, wherein an edge-detecting and curve-adjusting technique is used to adjust the detailed locations of the remaining reference feature curves of each selected feature curve model, so as to a tracing best fitting the lateral cephalogram, and a tracing best fitting the posteroanterior cephalogram. Such as shown by the arrows in FIG. 5, step 250 is performed to adjust the detailed locations of the remaining reference feature curves of the lateral feature curve model 24 one by one, so that an optimum overlap and march effect can be achieved between the lateral feature curve model 24 and the image of the lateral cephalogram 10, and thus the lateral feature curve model 24 after adjustment is the tracing of the lateral cephalogram 10 input at step 212. Similarly, the tracing of the posteroanterior cephalogram 12 input at step 214 also can be obtained via the aforementioned steps. The edge-detection and curve-adjustment technique applied in this embodiment is well know to those who are skilled in the art, and thus is not described in detail herein.

After the tracings of the lateral and posteroanterior cephalograms are obtained, step 260 of positioning 2D and 3D landmarks, step 270 of computing diagnosis parameters, and step 280 of outputting a case report also can be applied in this embodiment.

Figure 6:
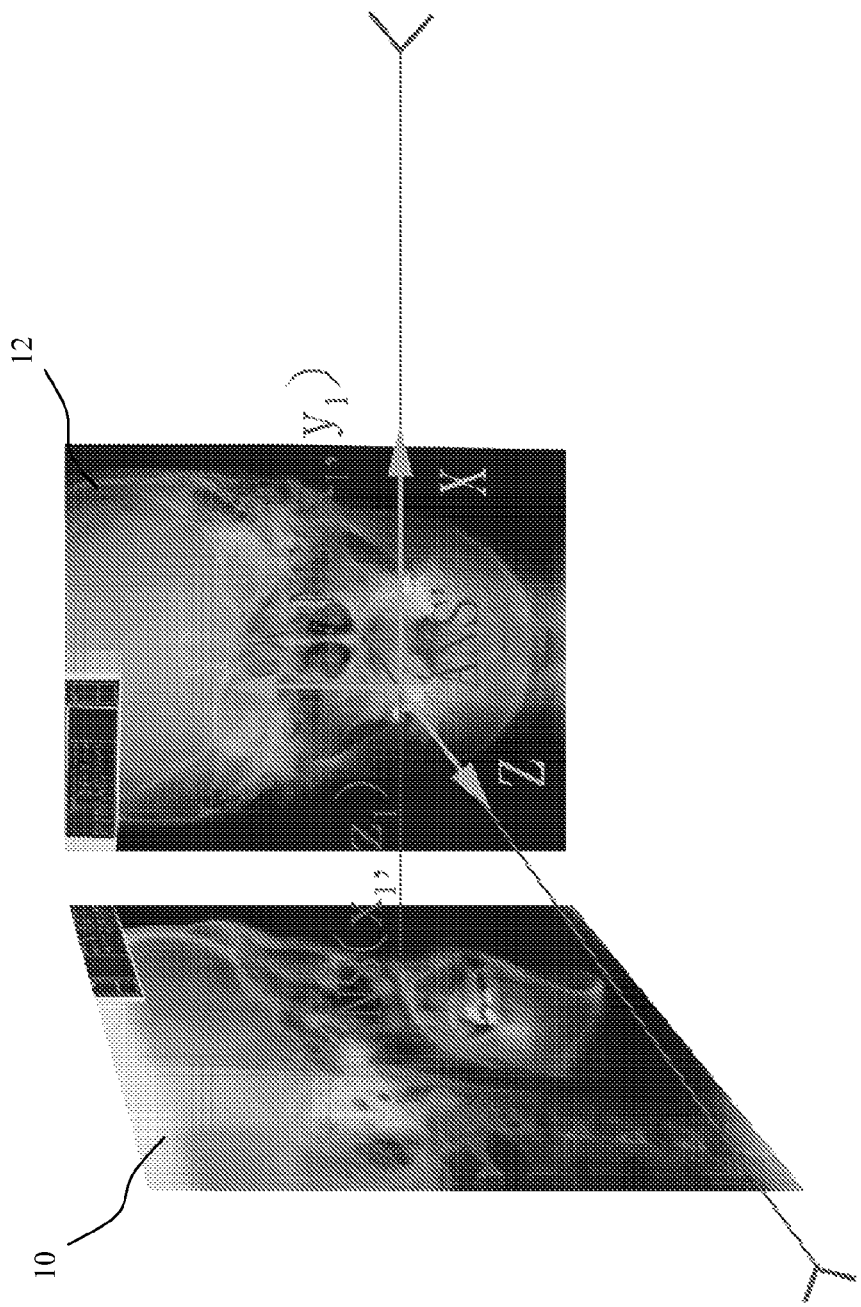
FIG. 6 is a schematic diagram of estimating a 3D coordinate of a landmark according to the embodiment of the present invention.

Referring to FIG. 6, FIG. 6 is a schematic diagram of estimating a 3D coordinate of a landmark according to the embodiment of the present invention. In step 260, the 2D coordinates of a landmark ANS can be obtained from the tracing of the lateral cephalogram and that of the posteroanterior cephalogram, and are noted as $ANS(x_1, y_1)$ and $ANS(x_1, z_1)$, and then the 3D coordinate of the landmark ANS can be estimated by using a back projection method.

In step 270, the cephalometric analysis data required by clinic diagnosis can be computed in accordance with the positions of landmarks by such as a clinic analysis method or an analysis method defined by an individual physician.

Referring to FIG. 7, FIG. 7 is a schematic diagram of a case report according to the embodiment of the present invention. In step 280, the case data, the analysis result from step 270 and the tracing (i.e. the lateral feature curve model after adjustment) can be printed together to form a case report.

It can be known from the embodiment of the present invention that: the cephalogram image analysis method of the present invention can effectively and accurately transform a cephalogram into a tracing, thus saving time and effort, and avoiding relying on expert experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cephalogram image analysis method, comprising:
    performing a step of building a reference database for establishing a set of tracing feature curve models respectively representing a set of reference cephalometric patterns in accordance with a set of tracing records;
    performing a step of pattern comparison and analysis, the step of pattern comparison and analysis comprising:
    inputting at least one cephalogram;
    performing a comparison step for comparing the image of the at least one cephalogram with the tracing feature curve models, thereby selecting at least one cephalometric pattern and at least one feature curve model belonging to the at least one cephalometric pattern from the reference cephalometric patterns and the tracing feature curve models; and
    fitting the at least one feature curve model to the image of the at least one cephalogram respectively, so as to obtain at least one tracing of the at least one cephalogram.

2. The method as claimed in claim 1, wherein the step of building the reference database further comprises:
    inputting the tracing records, wherein each of the tracing records has a set of tracing curves;
    defining a set of reference feature portions;
    vectorizing the tracing curves located at the reference feature portions in each of the tracing records, thereby obtaining a set of reference vector curves of each of the tracing records;
    analyzing the reference vector curves of each of the tracing records, thereby obtaining the reference cephalometric patterns;
    classifying the tracing records into the reference cephalometric patterns; and
    extracting a set of reference feature curves with respect to the reference vector curves of the tracing records belonging to each of the reference cephalometric patterns, thereby establishing the tracing feature curve models respectively representing the reference cephalometric patterns.

3. The method as claimed in claim 2, wherein the step of pattern comparison and analysis further comprises:
retrieving and vectorizing the profile features from the image of each of the at least one cephalogram, and the curves of the image of each of the at least one cephalogram located at the reference feature portions, thereby obtaining a set of feature curves of the image of each of the at least one cephalogram;
performing the comparison step with respect to the feature curves of the image of each of the at least one cephalogram, and the reference feature curves of the tracing feature curve models, thereby obtaining the at least one cephalometric pattern and the at least one feature curve model belonging to the at least one cephalometric pattern;
respectively aligning at least one of the reference feature curves of each of the at least one feature curve model to at least one of the feature curves of the cephalogram corresponding to the feature curve mode; and
using an edge-detection and curve-adjustment technique to elastically adjust the detailed locations of the remaining ones of the reference feature curves of each of the at least one feature curve model, thereby overlapping and matching the image of the at least one cephalogram with the at least one feature curve model.

4. The method as claimed in claim 1, wherein the reference feature portions are defined in accordance with the definition of positions of a set of landmarks and the image features surrounding the landmarks.

5. The method as claimed in claim 1, wherein the reference feature portions are defined in accordance with the sizes and growth patterns of human skulls.

6. The method as claimed in claim 1, wherein the at least one cephalogram comprises a lateral cephalogram and a posteroanterior cephalogram.

7. The method as claimed in claim 6, further comprising:
using a back projection method to estimate at least one 3-D coordinate of at least on landmark in accordance with the feature curve models obtained by inputting the lateral cephalogram and the posteroanterior cephalogram.

8. The method as claimed in claim 1, wherein the tracing records are a set of digital image files.

9. The method as claimed in claim 1, wherein the at least one cephalogram is at least one digital image file.

10. The method as claimed in claim 1, wherein the at least one cephalogram is at least one digital image file in gray level.

* * * * *